(12) United States Patent
De Bernardinis

(10) Patent No.: US 12,074,961 B1
(45) Date of Patent: Aug. 27, 2024

(54) CLOCK PATH EQUALIZATION IN DUAL PATH CDR

(71) Applicant: Marvell Asia Pte Ltd, Singapore (SG)

(72) Inventor: Fernando De Bernardinis, Pavia (IT)

(73) Assignee: Marvell Asia Pte Ltd, Singapore (SG)

( * ) Notice: Subject to any disclaimer, the term of this patent is extended or adjusted under 35 U.S.C. 154(b) by 69 days.

(21) Appl. No.: 18/145,187

(22) Filed: Dec. 22, 2022

Related U.S. Application Data

(60) Provisional application No. 63/299,359, filed on Jan. 13, 2022.

(51) Int. Cl.
*H04L 7/00* (2006.01)
*H04L 25/03* (2006.01)

(52) U.S. Cl.
CPC .......... *H04L 7/0058* (2013.01); *H04L 7/0016* (2013.01); *H04L 25/03057* (2013.01)

(58) Field of Classification Search
CPC ................. H04L 7/0058; H04L 7/0016; H04L 25/03057
See application file for complete search history.

(56) References Cited

U.S. PATENT DOCUMENTS

| 9,215,107 | B1 | 12/2015 | De Bernardinis | |
|---|---|---|---|---|
| 2017/0104614 | A1* | 4/2017 | Ma | H04L 25/03267 |
| 2017/0180002 | A1* | 6/2017 | Kiran | H04B 1/0007 |
| 2023/0362041 | A1* | 11/2023 | Nir | H04L 27/06 |

* cited by examiner

*Primary Examiner* — Janice N Tieu

(57) ABSTRACT

Clock data recovery circuitry, for a deserializer of a data transceiver, includes a clock recovery loop with a first feed-forward equalizer having a smaller number of taps and operating on received signals to recover a clock signal, and a data recovery loop including a second feed-forward equalizer having a larger number of taps, operating on received signals to recover a data signal. Output of the second feed-forward equalizer is coupled to output of the first feed-forward equalizer to improve recovery of the clock signal. The clock recovery loop may include adaptation circuitry configured to operate on output of the first feed-forward equalizer to counteract effects, on the clock signal, of adaptation of the second feed-forward equalizer by signals output by a decision feedback equalizer in the data recovery loop.

22 Claims, 5 Drawing Sheets

CLOCK PATH EQUALIZATION IN DUAL PATH CDR

CROSS REFERENCE TO RELATED APPLICATION

This disclosure claims the benefit of copending, commonly-assigned United States Provisional Patent Application No. 63/299,359, filed Jan. 13, 2022, which is hereby incorporated by reference herein in its entirety.

FIELD OF USE

This disclosure relates to clock-data recovery in a serial interface. More particularly, this disclosure relates to equalization of the clock recovery loop in clock data recovery circuitry, by borrowing equalizer circuitry from the data recovery loop.

BACKGROUND

The background description provided herein is for the purpose of generally presenting the context of the disclosure. Work of the inventor hereof, to the extent the work is described in this background section, as well as aspects of the description that may not otherwise qualify as prior art at the time of filing, are neither expressly nor impliedly admitted to be prior art against the subject matter of the present disclosure.

In some types of clock data recovery circuitry, the clock and the data are recovered in separate equalizer paths or loops. For example, the data may be recovered by a feed-forward equalizer which feeds a decision feedback equalizer whose output is used to adaptively adjust the coefficients of the feed-forward equalizer. At the same time, the clock may be recovered in a separate loop having a smaller feed-forward equalizer whose sliced output feeds a timing error detector, with slicer error being used to adaptively adjust the coefficients of the smaller feed-forward equalizer. However, in such an arrangement, the feed-forward equalizer in the clock recovery loop may be insufficient to deal with long tails or close-in reflections in the impulse response of the clock recovery loop. Resulting error in the recovered clock may cause data errors that cannot be corrected by typical forward error correction techniques.

SUMMARY

In accordance with implementations of the subject matter of this disclosure, clock data recovery circuitry, for a deserializer of a data transceiver, includes a clock recovery loop including a first feed-forward equalizer having a first number of taps and configured to operate on received signals to recover a clock signal, and a data recovery loop including a second feed-forward equalizer having a second number of taps greater than the first number, and configured to operate on received signals to recover a data signal, output of the second feed-forward equalizer being coupled to output of the first feed-forward equalizer to improve recovery of the clock signal.

In a first implementation of such clock data recovery circuitry, the data recovery loop may include a decision feedback equalizer configured to operate on the output of the second feed-forward equalizer to output signals used to adapt coefficients of the second feed-forward equalizer, and the clock recovery loop may include first adaptation circuitry configured to operate on output of the first feed-forward equalizer to counteract effects, on the clock signal, resulting from adaptation of the second feed-forward equalizer by the signals output by the decision feedback equalizer.

According to a first aspect of that first implementation, the clock recovery loop may further include a first data slicer configured to operate on output of the first feed-forward equalizer, a timing error detector configured to derive a clock from output of the first data slicer, and first slicer error circuitry configured to determine a first slicer error from a difference between input of the first data slicer and the output of the first data slicer, and the first adaptation circuitry may be configured to adjust coefficients of the first feed-forward equalizer based on the first slicer error.

In a first instance of that first aspect, the timing error detector may be configured to derive the clock from the output of the first data slicer and the first slicer error.

In a second instance of that first aspect, the data recovery loop may further include a second data slicer configured to operate on output of the decision feedback equalizer to recover the data signal, second slicer error circuitry configured to determine a second slicer error from a difference between input of the decision feedback equalizer and output of the second data slicer, and second adaptation circuitry configured to adjust coefficients of the second feed-forward equalizer based on the second slicer error.

A first alternative of that first instance may further include first gain control circuitry configured to amplify output of the first feed-forward equalizer.

In a first variant of that first alternative, the first gain control circuitry may be integral with the first feed-forward equalizer.

In a second variant of that first alternative, the first gain control circuitry may be separate from the first feed-forward equalizer, and the first adaptation circuitry may further be configured to adjust the first gain control circuitry.

A second alternative of that second instance may further include second gain control circuitry configured to amplify output of the second feed-forward equalizer.

In a first variant of that second alternative, the second gain control circuitry may be integral with the second feed-forward equalizer.

In a second variant of that second alternative, the second gain control circuitry may be separate from the second feed-forward equalizer, and the second adaptation circuitry may further be configured to adjust the second gain control circuitry.

A second aspect of that first implementation may further include a third feed-forward equalizer in parallel with the second feed-forward equalizer and configured to equalize reflections occurring in impulse response of the clock data recovery circuitry.

In accordance with implementations of the subject matter of this disclosure, a method of recovering a clock, in a deserializer of a data transceiver, includes performing a first feed-forward equalization operation, using a first number of taps, on a received signal to recover a clock signal, performing a second feed-forward equalization operation, using a second number of taps greater than the first number, on the received signal to recover a data signal, and combining output of the second feed-forward equalization operation with output of the first feed-forward equalization operation to improve recovery of the clock signal.

In a first implementation of such a method, performing the second feed-forward equalization operation to recover the data signal may further include performing a decision feedback equalization operation to adapt coefficients of the second feed-forward equalization operation, and the method may further include performing adaptation of the first feed-forward equalization operation to counteract effects, on the clock signal, resulting from adaptation of the second feed-forward equalization operation based on the decision feedback equalization operation.

A first aspect of that first implementation may further include performing a first slicing operation on output of the first feed-forward equalization, deriving a clock from output of the first slicing operation based on timing error detection, and determining a first slicer error from a difference between input of the first slicing operation and the output of the first slicing operation, where performing adaptation of the first feed-forward equalization operation may include adjusting coefficients of the first feed-forward equalization operation based on the first slicer error.

In a first instance of that first aspect, deriving the clock from the output of the first slicing operation based on the timing error detection may include deriving the clock from the output of the first slicing operation and from the slicer error, based on the timing error detection.

A second instance of that first aspect may further include performing a second slicing operation on output of the decision feedback equalization operation to recover the data signal, determining a second slicer error from a difference between input of the decision feedback equalization operation and output of the second slicing operation, and adjusting coefficients of the second feed-forward equalization operation based on the second slicer error.

A first alternative of that second instance may further include controlling gain to amplify output of the first feed-forward equalization operation, using separate first gain control circuitry.

In a first variant of that first alternative, performing adaptation of the first feed-forward equalization operation may include performing adaptation of the separate gain control circuitry.

A second alternative of that second instance may further include controlling gain to amplify output of the second feed-forward equalization operation, using separate second gain control circuitry.

A first variant of that second alternative may further include performing adaptation to adjust the second gain control circuitry.

A second aspect of that first implementation may further include performing a third feed-forward equalization operation, which is not adapted by the decision feedback equalization operation, to equalize reflections occurring in impulse response of the deserializer to the received signal.

BRIEF DESCRIPTION OF THE DRAWINGS

Further features of the disclosure, its nature and various advantages, will be apparent upon consideration of the following detailed description, taken in conjunction with the accompanying drawings, in which like reference characters refer to like parts throughout, and in which.

DETAILED DESCRIPTION

Figure 1:
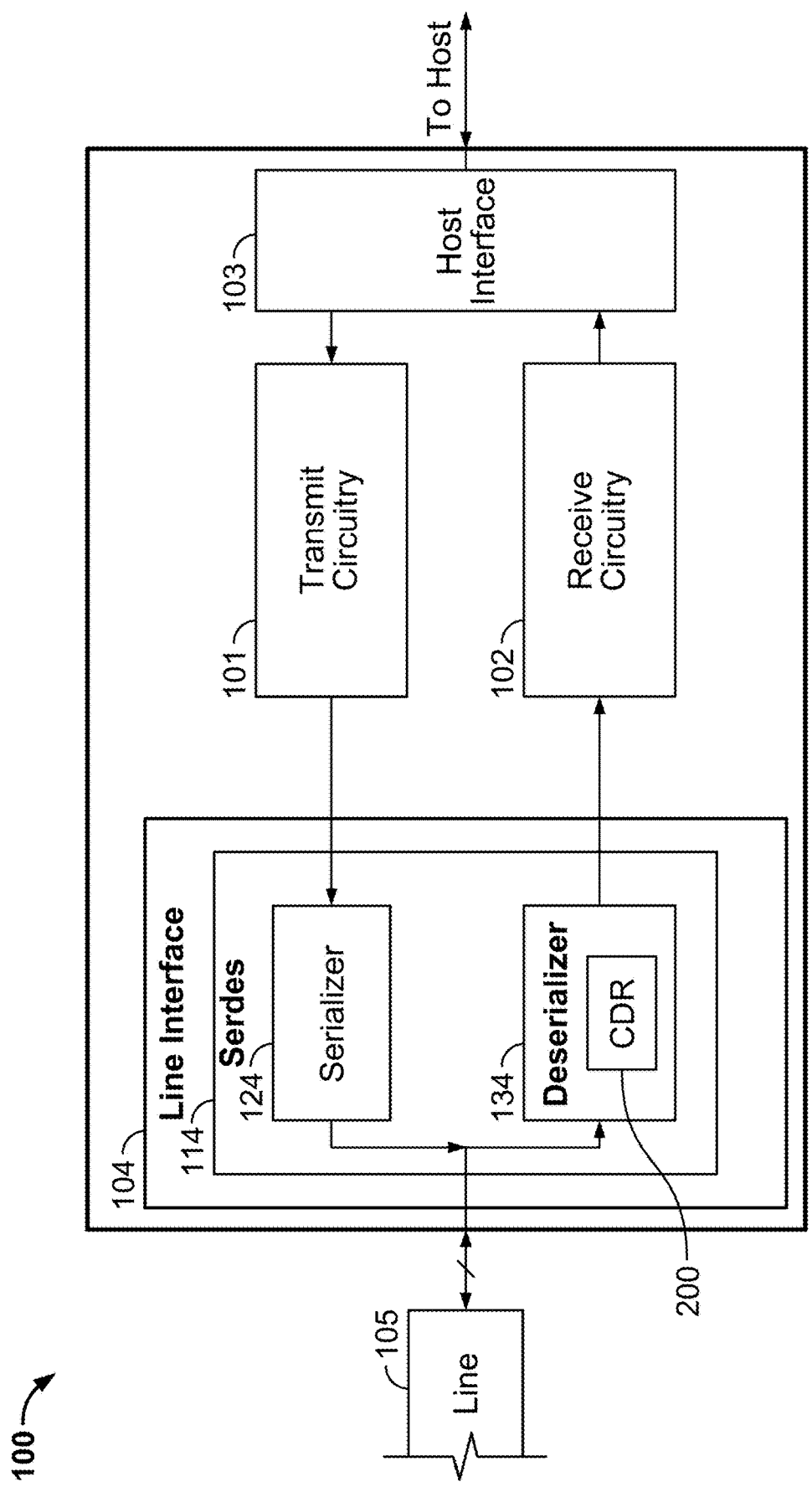
FIG. 1 is a high-level block diagram of a serial data transceiver according to implementations of the subject matter of this disclosure.

As described above, in some types of clock data recovery circuitry, the clock and the data are recovered in separate equalizer paths or loops. For example, as described in commonly-assigned U.S. Pat. No. 9,215,107 (which is hereby incorporated by reference herein in its entirety), the data may be recovered by a feed-forward equalizer which feeds a decision feedback equalizer whose output is used to adaptively adjust the coefficients of the feed-forward equalizer. At the same time, the clock may be recovered in a separate loop ("clock recovery loop" or "digital timing loop") having a smaller feed-forward equalizer whose sliced output feeds a timing error detector, with slicer error being used to adaptively adjust the coefficients of the smaller feed-forward equalizer. However, in such an arrangement, the feed-forward equalizer in the digital timing loop may be insufficient to deal with long tails or close-in reflections in the impulse response of the digital timing loop. Resulting error in the recovered clock may cause data errors that cannot be corrected by typical forward error correction techniques.

One potential solution to eliminate errors in the digital timing loop resulting from long tails or close-in reflections might be to increase the number of taps on the feed-forward equalizer (FFE) in the digital timing loop (DTL). However, increasing the size of the DTL FFE would increase both the device area required to accommodate the DTL, and the power consumed by the DTL.

The present disclosure provides an alternative that does not increase device area or power consumption. In accordance with implementations of the subject matter of the present disclosure, the DTL, which has a shorter FFE than the data recovery loop, borrows the output of the FFE from the data recovery loop for use in recovering the clock. The only change in the CDR circuitry is a conductor coupling the output of the FFE in the data recovery loop (DRL) to the output of the DTL FEE. The DRL FFE continues to feed the DFE to provide the recovered data, but also aids in recovering the clock in the DTL.

The coefficients of the DRL FFE are adaptively adjusted based on feedback of the recovered data from the output of the DFE and a subsequent slicer, using a suitable adaptation function (e.g., a least mean squares function). That adjustment of the DRL FFE coefficients, for purposes of data recovery, may adversely affect the output of the DRL FFE for clock recovery purposes. However, in the DTL, the DRL FFE output will be included in the input to the adaptation loop for the DTL FFE (which may be slicer error—i.e., the difference between the combined FFE outputs before and after slicing), and therefore the adaptation function (again, e.g., a least mean squares function) will inherently correct for any effects that the DFE, via the DRL adaptation function, might have had on the DRL FFE that might adversely affect the recovery of the clock by the DTL (e.g., the addition of pipeline stages that may affect timing closure).

Optionally, in some implementations, a further FFE may be added in parallel with the DRL FFE to handle reflections. The output of any such reflection FFE may also be coupled to the output of the DTL FFE. While no adaptation of the reflection FFE is contemplated, if such adaptation were to be performed, any adverse effect of such adaptation on the DTL would be remediated by the adaptation function in the DTL.

The subject matter of this disclosure may be better understood by reference to FIGS. 1-5.

FIG. 1 is a high-level block diagram of a serial data transceiver 100 which may incorporate implementations of the subject matter of this disclosure. Transceiver 100 may include transmit circuitry 101 and receive circuitry 102 coupled, at one end to a host interface 103 for communication with a locally-situated host device (not shown), and at the other end to a line interface 104 for sending and receiving signals from and to a transmission medium 105 (e.g., a copper or fiber cable). Data may be communicated serially on transmission medium 105, and line interface 104 may include serializer/deserializer (SERDES) circuitry 114 configured to convert between serial signals on transmission medium 105 and parallel signals at host interface 103. SERDES circuitry 114 include serializer circuitry 124 configured to serialize parallel signals for transmission onto medium 105, and deserializer circuitry 134 configured to deserialize signals received from medium 105.

Figure 2:
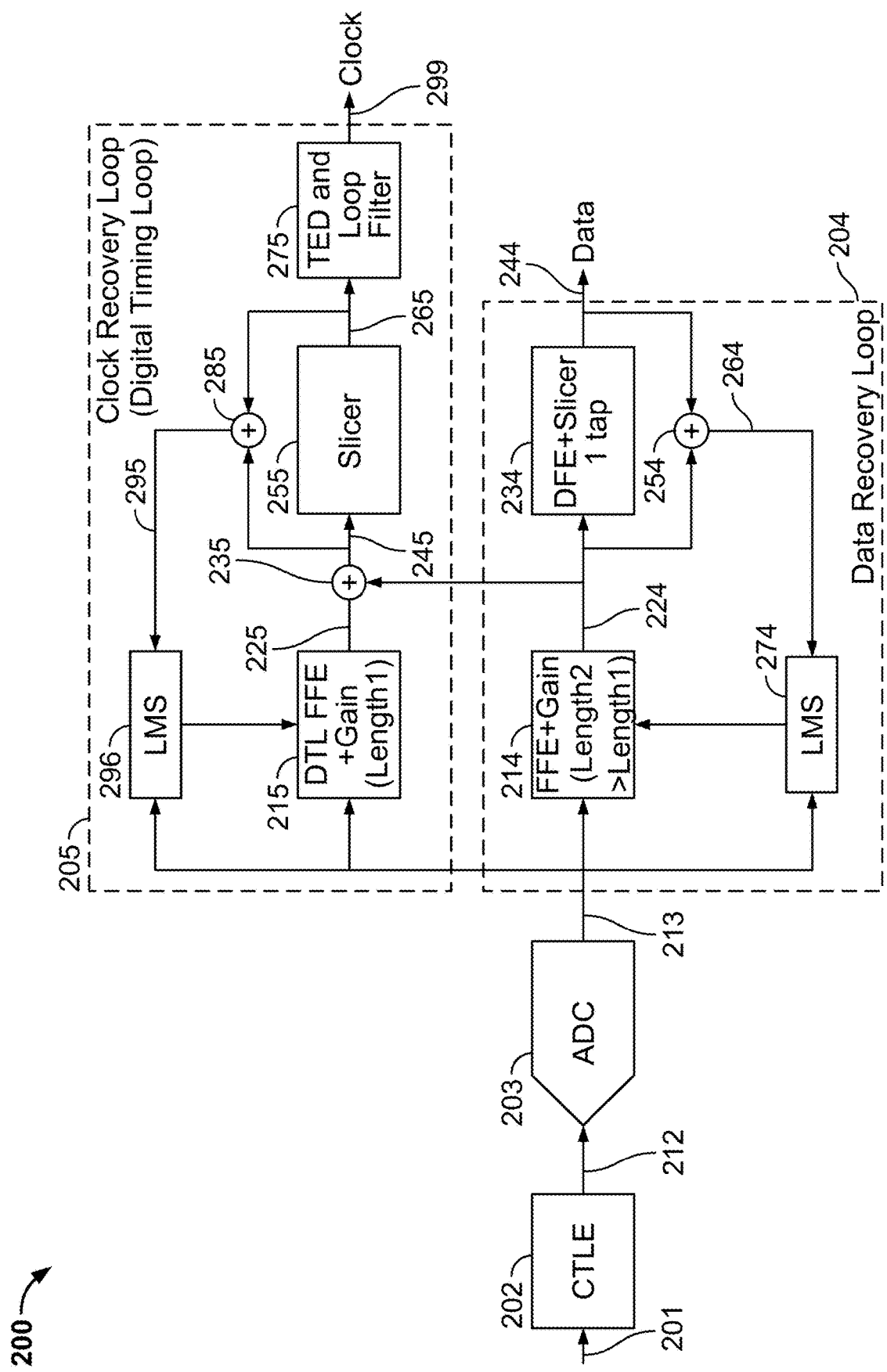
FIG. 2 is a schematic diagram of clock-data recovery circuitry in accordance with a first implementation of the subject matter of this disclosure.

An implementation of clock-data recovery (CDR) circuitry 200 in accordance with the subject matter of this disclosure, which may be incorporated into deserializer circuitry 134, is shown in FIG. 2. Signals 201 received from medium 105 are first filtered by continuous time linear equalizer (CTLE) 202 to remove low-frequency components, and the filtered signals 212 are digitized by analog-to-digital converter (ADC) 203. Digitized signals 213 are input to both data recovery loop 204 and clock recovery loop (i.e., DTL) 205.

Data recovery loop 204 includes DRL FFE 214, which may also include an amplifier to introduce gain to the equalized signal 224. Signal 224 is further processed in DFE 234, which may also include slicer circuitry (although the slicer circuitry may be separate (not shown)). A data error signal 264 is derived at 254 from signal 224 and recovered data 244 (i.e., the input and output of DFE 234) and used to adapt DRL FFE 214 using, for example, a least-mean-squares adaptation function 274.

Clock recovery loop (e.g., digital timing loop—DTL) 205 includes DTL FFE 215, which may also include an amplifier to introduce gain to the equalized signal 225. Signal 225 is combined at 235 with the output 224 of DRL FFE 214 and the combined signal 245 is sliced at 255. Slicer error 295, determined at 285, is used to adapt DTL FFE 215 using, for example, a least-mean-squares adaptation function 296. Adaptation function 296 will inherently correct for any effects that DFE 234, via the DRL adaptation function 274, might have had on DRL FFE 214 that might adversely affect the recovery of clock 299 by DTL 205, as described above. Slicer output 265, along with slicer error 295, are input to timing error detector (TED) and an associated loop filter 275 to recover the clock 299 from signal 201.

As noted above, DTL FFE 215 may be shorter (i.e., may include fewer taps) than DRL FFE 214. For example, in one implementation, DTL FFE 215 may include five taps, while DRL FFE 214 may include seventeen taps. Coupling the output of DRL FFE 214 to DTL 205 provides a long FFE for the clock recovery function, without adding hardware (i.e., power and area) to the system, to handle long tails and reflections.

Figure 3:
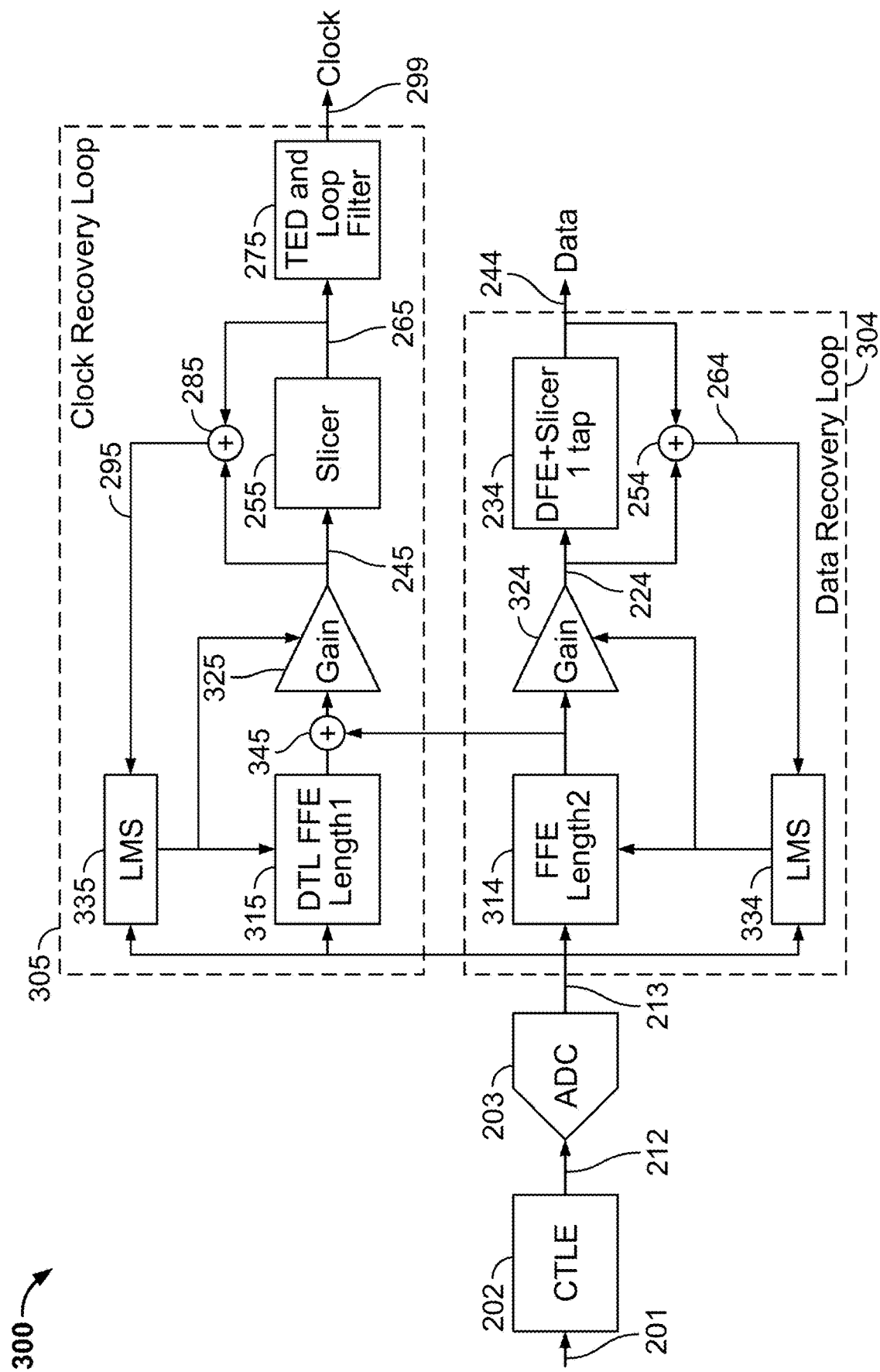
FIG. 3 is a schematic diagram of clock-data recovery circuitry in accordance with a second implementation of the subject matter of this disclosure.

An alternative implementation 300 of clock-data recovery (CDR) circuitry in accordance with implementations of the subject matter of this disclosure, which may be incorporated into deserializer circuitry 134, is shown in FIG. 3. CDR circuitry 300 is substantially identical to CDR circuitry 200, except that the DRL FFE 314 and amplifier/gain 324 in data recovery loop 304 are provided separately, as are the DTL FFE 315 and amplifier/gain 325 in clock recovery loop 305. DRL FFE 314 and amplifier/gain 324 are both adapted by adaptation function 334, while DTL FFE 315 and amplifier/gain 325 are both adapted by adaptation function 335. Because the output of DRL FFE 314 is coupled to clock recovery loop 305 at 345 before the application of gain 324, the degree of adaptation required at 335 to negate the effects of DFE 234 may be reduced.

Figure 4:
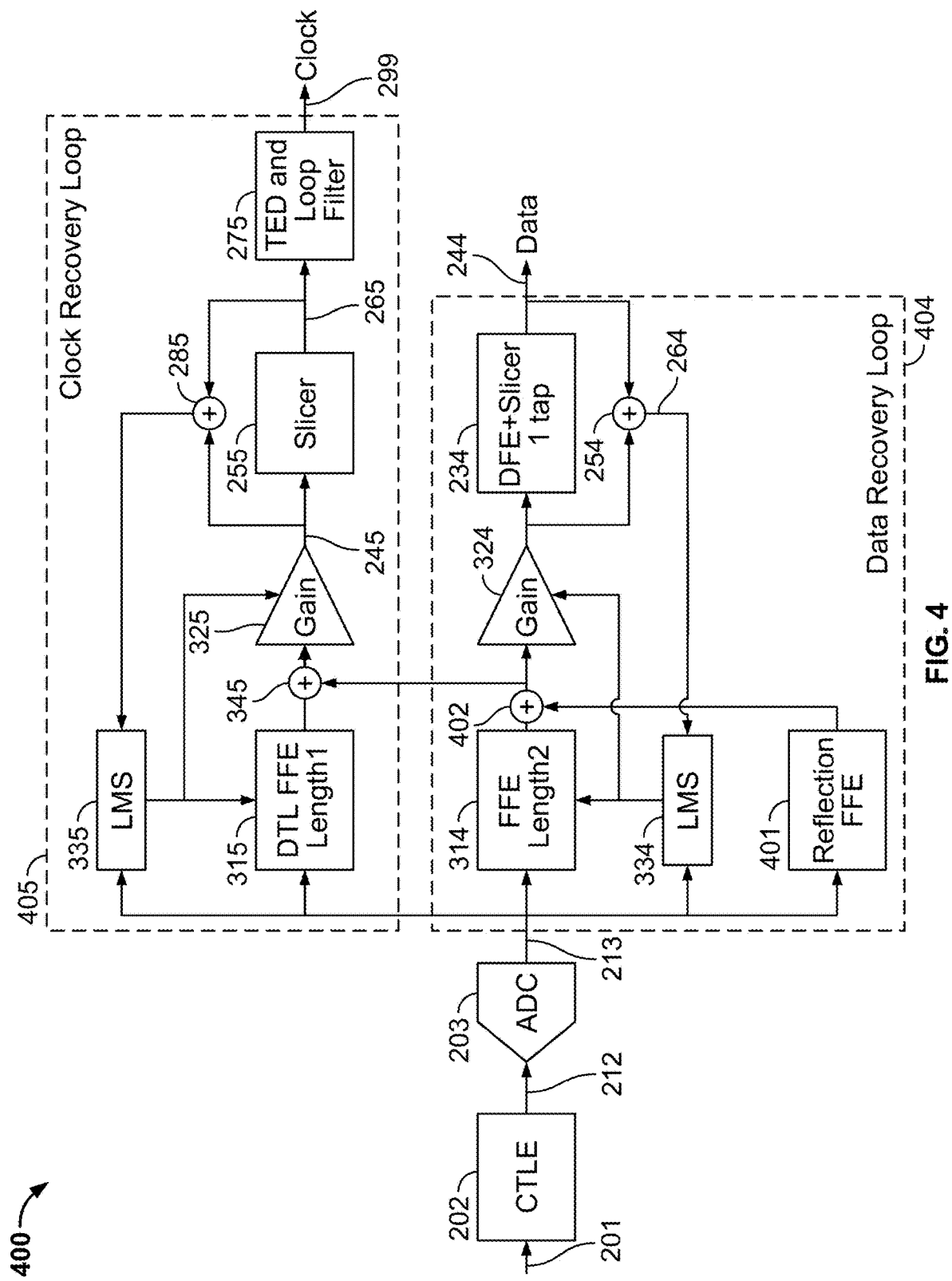
FIG. 4 is a schematic diagram of clock-data recovery circuitry in accordance with a third implementation of the subject matter of this disclosure.

In a further alternative implementation 400 of the subject matter of this disclosure, as shown in FIG. 4, an additional FFE 401 may be added to the data recovery loop 404 to cancel reflections. The output of FFE 401 may be added at 402 to the output of DRL FFE 314 before that output is coupled to DTL 405. Although this separate reflection FFE 401 is shown in the context of CDR circuitry 300, a separate reflection FFE also may added (not shown), in the same manner, to CDR circuitry 200.

Figure 5:
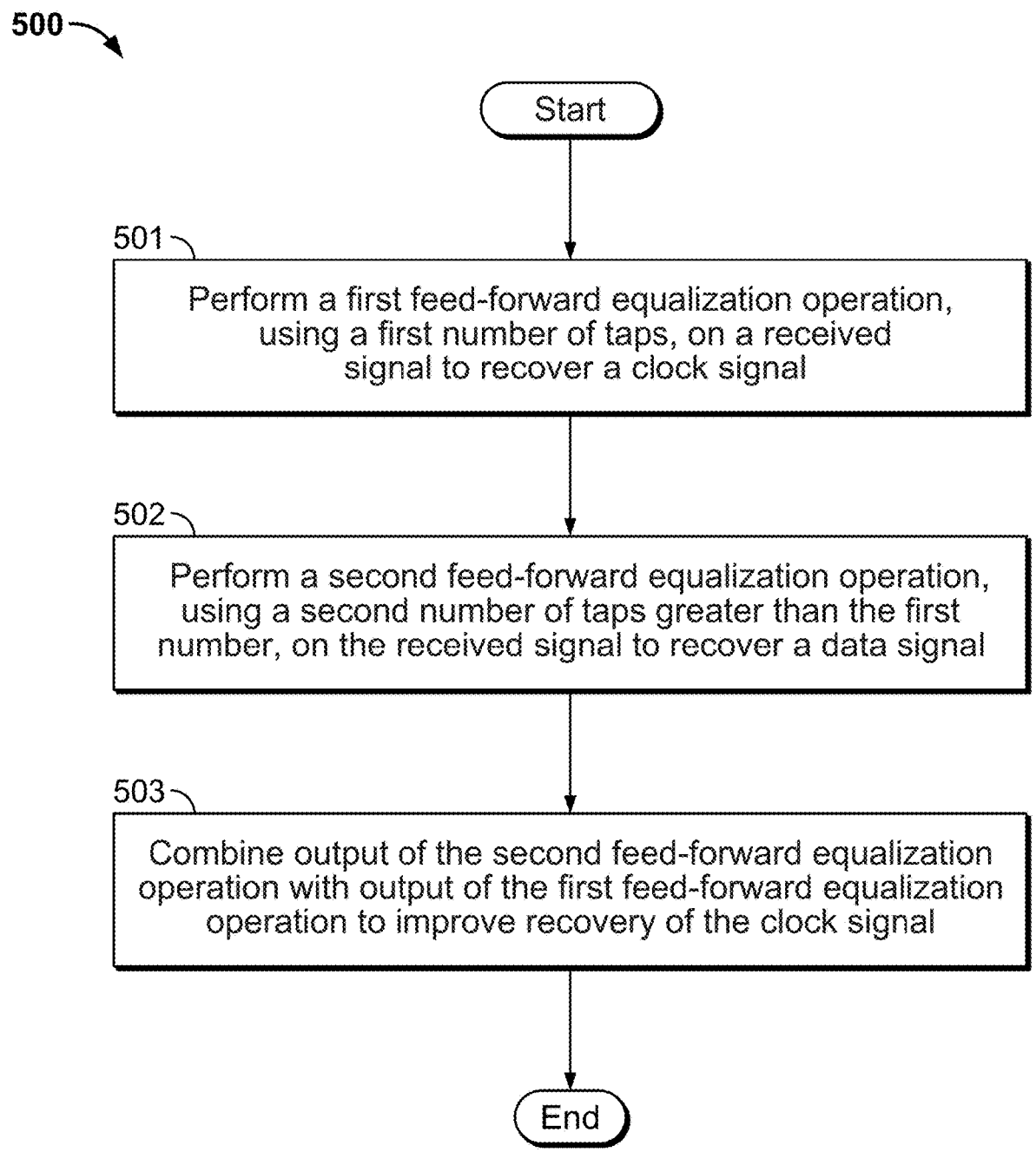
FIG. 5 is a flow diagram showing a method in accordance with implementations of the subject matter of this disclosure.

A method 500 according to implementations of the subject matter of this disclosure for performing clock data recovery in an integrated circuit transceiver device is diagrammed in FIG. 5. Method 500 begins at 501 where a first feed-forward equalization operation, using a first number of taps, is performed on a received signal to recover a clock signal. At 502, a second feed-forward equalization operation, using a second number of taps greater than the first number (i.e., using a longer FFE), is performed on the received signal to recover a data signal. At 503, output of the second feed-forward equalization operation is combined with output of the first feed-forward equalization operation to improve recovery of the clock signal. Method 500 then ends.

Thus it is seen that equalization of the clock recovery loop in clock data recovery circuitry, by borrowing equalizer circuitry from the data recovery loop has been provided, improving performance with little increase in power consumption or device area. Long tails and reflections may be equalized in the clock recovery loop just as they are in the data recovery loop, resulting in reduced jitter. Moreover, forward error correction performance may be improved if inter-symbol interference is concentrated in a small number of taps.

As used herein and in the claims which follow, the construction "one of A and B" shall mean "A or B."

It is noted that the foregoing is only illustrative of the principles of the invention, and that the invention can be practiced by other than the described embodiments, which are presented for purposes of illustration and not of limitation, and the present invention is limited only by the claims which follow.

What is claimed is:

1. Clock data recovery circuitry for a deserializer of a data transceiver, the clock data recovery circuitry comprising:
   a clock recovery loop including a first feed-forward equalizer having a first number of taps and configured to operate on received signals to recover a clock signal; and
   a data recovery loop including a second feed-forward equalizer having a second number of taps greater than the first number, and configured to operate on received signals to recover a data signal, output of the second feed-forward equalizer being coupled to output of the first feed-forward equalizer to improve recovery of the clock signal.

2. The clock data recovery circuitry of claim 1 wherein:
the data recovery loop comprises a decision feedback equalizer configured to operate on the output of the second feed-forward equalizer to output signals used to adapt coefficients of the second feed-forward equalizer; and
the clock recovery loop comprises first adaptation circuitry configured to operate on output of the first feed-forward equalizer to counteract effects, on the clock signal, resulting from adaptation of the second feed-forward equalizer by the signals output by the decision feedback equalizer.

3. The clock data recovery circuitry of claim 2 wherein: the clock recovery loop further comprises:
a first data slicer configured to operate on output of the first feed-forward equalizer,
a timing error detector configured to derive a clock from output of the first data slicer, and
first slicer error circuitry configured to determine a first slicer error from a difference between input of the first data slicer and the output of the first data slicer; and
the first adaptation circuitry is configured to adjust coefficients of the first feed-forward equalizer based on the first slicer error.

4. The clock data recovery circuitry of claim 3 wherein the timing error detector is configured to derive the clock from the output of the first data slicer and the first slicer error.

5. The clock data recovery circuitry of claim 3 wherein the data recovery loop further comprises:
a second data slicer configured to operate on output of the decision feedback equalizer to recover the data signal;
second slicer error circuitry configured to determine a second slicer error from a difference between input of the decision feedback equalizer and output of the second data slicer; and
second adaptation circuitry configured to adjust coefficients of the second feed-forward equalizer based on the second slicer error.

6. The clock data recovery circuitry of claim 5 further comprising first gain control circuitry configured to amplify output of the first feed-forward equalizer.

7. The clock data recovery circuitry of claim 6 wherein the first gain control circuitry is integral with the first feed-forward equalizer.

8. The clock data recovery circuitry of claim 6 wherein:
the first gain control circuitry is separate from the first feed-forward equalizer; and
the first adaptation circuitry is further configured to adjust the first gain control circuitry.

9. The clock data recovery circuitry of claim 5 further comprising second gain control circuitry configured to amplify output of the second feed-forward equalizer.

10. The clock data recovery circuitry of claim 9 wherein the second gain control circuitry is integral with the second feed-forward equalizer.

11. The clock data recovery circuitry of claim 9 wherein:
the second gain control circuitry is separate from the second feed-forward equalizer; and
the second adaptation circuitry is further configured to adjust the second gain control circuitry.

12. The clock data recovery circuitry of claim 2 further comprising a third feed-forward equalizer in parallel with the second feed-forward equalizer and configured to equalize reflections occurring in impulse response of the clock data recovery circuitry.

13. A method of recovering a clock in a deserializer of a data transceiver, the method comprising:
performing a first feed-forward equalization operation, using a first number of taps, on a received signal to recover a clock signal;
performing a second feed-forward equalization operation, using a second number of taps greater than the first number, on the received signal to recover a data signal; and
combining output of the second feed-forward equalization operation with output of the first feed-forward equalization operation to improve recovery of the clock signal.

14. The method of recovering a clock according to claim 13 wherein:
performing the second feed-forward equalization operation to recover the data signal further comprises performing a decision feedback equalization operation to adapt coefficients of the second feed-forward equalization operation; the method further comprising:
performing adaptation of the first feed-forward equalization operation to counteract effects, on the clock signal, resulting from adaptation of the second feed-forward equalization operation based on the decision feedback equalization operation.

15. The method of recovering a clock according to claim 14 further comprising:
performing a first slicing operation on output of the first feed-forward equalization,
deriving a clock from output of the first slicing operation based on timing error detection; and
determining a first slicer error from a difference between input of the first slicing operation and the output of the first slicing operation; wherein:
performing adaptation of the first feed-forward equalization operation comprises adjusting coefficients of the first feed-forward equalization operation based on the first slicer error.

16. The method of recovering a clock according to claim 15 wherein:
deriving the clock from the output of the first slicing operation based on the timing error detection comprises deriving the clock from the output of the first slicing operation and from the slicer error, based on the timing error detection.

17. The method of recovering a clock according to claim 15 further comprising:
performing a second slicing operation on output of the decision feedback equalization operation to recover the data signal;
determining a second slicer error from a difference between input of the decision feedback equalization operation and output of the second slicing operation; and
adjusting coefficients of the second feed-forward equalization operation based on the second slicer error.

18. The method of recovering a clock according to claim 17 further comprising controlling gain to amplify output of the first feed-forward equalization operation, using separate first gain control circuitry.

19. The method of recovering a clock according to claim 18 wherein performing adaptation of the first feed-forward equalization operation comprises performing adaptation of the separate gain control circuitry.

20. The method of recovering a clock according to claim 17 further comprising controlling gain to amplify output of the second feed-forward equalization operation, using separate second gain control circuitry.

21. The method of recovering a clock according to claim 20 further comprising performing adaptation to adjust the second gain control circuitry.

22. The method of recovering a clock according to claim 14 further comprising performing a third feed-forward equalization operation, which is not adapted by the decision feedback equalization operation, to equalize reflections occurring in impulse response of the deserializer to the received signal.

* * * * *